United States Patent [19]

Nakagawa et al.

[11] Patent Number: 4,562,957

[45] Date of Patent: Jan. 7, 1986

[54] AIR CONDITIONING/HEATING APPARATUS FOR AUTOMOBILES

[75] Inventors: Mitsuru Nakagawa, Chiryu; Yasuo Kondo; Atsushi Hashikawa, both of Okazaki, all of Japan

[73] Assignee: Nippon Soken, Inc., Nishio, Japan

[21] Appl. No.: 553,886

[22] Filed: Nov. 22, 1983

Related U.S. Application Data

[63] Continuation of Ser. No. 341,501, Jan. 21, 1982, abandoned.

[30] Foreign Application Priority Data

| Feb. 3, 1981 | [JP] | Japan | 56-13746 |
| Mar. 24, 1981 | [JP] | Japan | 56-42656 |
| Mar. 25, 1981 | [JP] | Japan | 56-42940[U] |
| Apr. 3, 1981 | [JP] | Japan | 56-48653[U] |
| Sep. 8, 1981 | [JP] | Japan | 56-133243[U] |

[51] Int. Cl.$^4$ ............................................. B60H 1/02
[52] U.S. Cl. ........................ 237/12.3 R; 237/12.3 A; 219/202
[58] Field of Search ...................... 237/12.3 R, 12.3 A; 98/2.05, 2.08; 219/202, 203; 165/47

[56] References Cited

U.S. PATENT DOCUMENTS

| 1,022,273 | 4/1912 | Smith | 237/12.3 R |
| 4,004,126 | 1/1977 | Boaz | 98/2.08 |
| 4,232,211 | 11/1980 | Hill | 237/12.3 A |

FOREIGN PATENT DOCUMENTS

| 518570 | 4/1953 | Belgium | 237/12.3 R |
| 492287 | 9/1938 | United Kingdom | 237/12.3 R |

Primary Examiner—Henry Bennett
Attorney, Agent, or Firm—Cushman, Darby & Cushman

[57] ABSTRACT

An air conditioning/heating apparatus for an automobile, comprising an assembly which is located on a steering column cover of the automobile, the heater assembly comprising an air duct, a heating element arranged in the air duct for heating the air passing through the heating element, and an air outlet opening from which the air is blown out.

33 Claims, 25 Drawing Figures

AIR CONDITIONING/HEATING APPARATUS FOR AUTOMOBILES

This is a continuation of application Ser. No. 341,501, filed Jan. 21, 1982, now abandoned.

This invention relates to an air conditioning/heating apparatus for automobiles, and, in particular, to an improved quick cooling and heating apparatus which enables cool or hot air to effectively reach the driver or passenger(s) in an automobile.

In a conventional air conditioner/heater for automobiles, hot air or cool air, which is produced by a heat exchanger, is sent into the passenger compartment of an automobile, through an outlet opening provided in an instrument panel located near the driver's seat, so that the driver feels the hot or cool air. For example, Japanese Patent Application Laid Open No. 52-155733 discloses a heating apparatus for automobiles, which comprises a positive temperature coefficient (PTC) heating element arranged in an air duct for heating the air flowing therethrough.

However, in conventional air conditioners for automobiles, the cool air or warm air in the case where the heater is operated blown from the outlet openings of the instrument panel does not directly strike upon the face or the hands of the driver, because of the location and direction of the outlet opening. Also, it takes some time for an automobile heater or air conditioner to heat or cool the air circulating in the passenger compartment. Therefore, for example when the driver operates the air conditioner of an automobile which has been parked for a long time under the scorching heat of the sun in summer, the driver feels hot for a time even after turning on the air conditioner. That is, even after the air conditioner has been turned on, the driver still feels uncomfortable for a time. On the other hand, in winter, hot air cannot be provided until the engine coolant, which serves as a heat source for a hot water type heater, is warmed enough. Furthermore, in the case of a heater having the PTC heating element arranged in the air duct, the temperature of the hot air is limited to a certain extent, because the allowable electrical power consumption for the PTC heating element is limited. Therefore, it is very important to decrease the reduction of loss of the temperature of the hot air. In the prior art, there is a large reduction in the temperature of the hot air, since the distance between the PTC heating element and the outlet opening of the hot air and the distance between the outlet opening and the driver are relatively long.

The output power of an air fan in a conventional hot-water type heater for automobiles is not large. In order that the driver may feel comfortable hot air, it is necessary to increase the number of revolutions of the fan. However, an increase in the number of revolutions of the fan increases the power consumption, which causes a decrease in the power which can be fed to the PTC heating element.

The primary object of the present invention is, therefore, to eliminate the above-mentioned drawbacks by providing an air conditioning/heating apparatus for automobiles having an outlet opening for cool air (the same opening also provides hot air when the heater is operated) which is provided in the vicinity of the steering column which is, in turn, located in front of the driver, so that hot or cool air can be directed to the driver immediately after the apparatus operates, without increasing the power consumption of the apparatus.

Another object of the present invention is to provide an air conditioning/heating apparatus for automobiles having an air blowing outlet opening which is located in the vicinity of the driver and which has means for deflecting the direction of the air flow so that the hot or cool air can be effectively and selectively sent to the driver's area or to other parts of the passenger compartment.

The invention will be discussed below in detail, with reference to the accompanying drawings which illustrate preferred embodiments of the present invention and in which.

Figure 1:
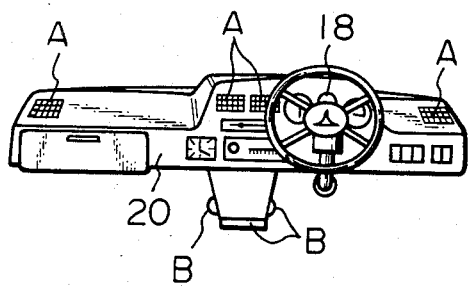
FIG. 1 is a perspective view of an arrangement of air blowing openings of a known air conditioning/heating apparatus on an instrument panel of an automobile.

FIG. 1 shows an arrangement of air blowing outlet openings in a conventional air conditioning/heating apparatus for automobiles. The air, which is produced by a heat exchanger, is blown out from outlet openings A provided on an instrument panel 20 of an automobile. However, in this arrangement, as mentioned previously, since the openings A are not focused directly on the driver, hot or cool air cannot be directly blown onto the driver, especially onto the driver's hands or face.

Figure 2:
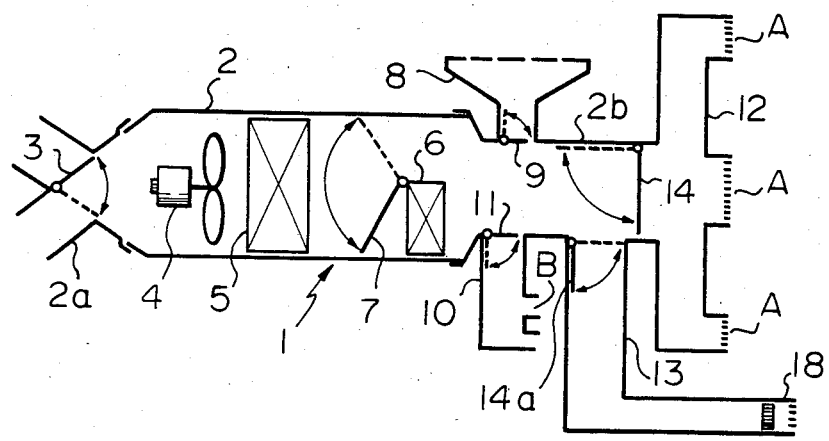
FIG. 2 is a schematic view of an embodiment of an air conditioning/heating apparatus, according to the present invention.

FIG. 2 shows an embodiment of the present invention. The apparatus of the invention is generally designated at 1. The apparatus includes a main duct 2. In this main duct 2, a motor driven air fan 4, a cooling heat exchanger 5, a damper 7 for controlling the mixing ratio between the hot air and the cold air, and a heating heat exchanger 6 are arranged, in this order, when viewed in the direction of the air flow. The main duct 2 has, at its upstream end, a switching box 2a connected thereto, which has two branch ducts one of which opens into the atmosphere outside the automobile and the other branch duct opens into the passenger compartment of the automobile. The switching box 2a has therein a switching damper 3 at the junction of the two branch ducts for selectively introducing the air inside or outside the automobile into the main duct 2. The main duct 2 has a downstream duct 2b connected thereto, which has a defroster outlet duct 8 and a lower outlet duct 10, which is oriented to the feet of the driver, at the junction of the downstream end of the main duct 2 and the upstream end of the downstream duct 2b. The duct 8 has a damper 9 at the junction of the ducts 2b and 8, which when opened allows the duct 2b to communicate with the duct 8 and when closed the communication between the ducts 2b and 8 is broken. The duct 10 also has a damper 11 at the junction of the ducts 2b and 10, which when opened allows the duct 2b to communicate with the duct 10 and when closed position the communication between the ducts 2b and 10 is broken. The air coming into the duct 10 from the main duct 2 through the downstream duct 2b is blown from outlet openings B of the duct 10, toward the feet of the driver.

The downstream duct 2b has a three-way blowing duct 12 at the downstream end of the duct 2b. The blowing duct 12 has three separate outlet openings A which correspond to the openings A on the instrument panel 20 shown in FIG. 1. At the junction of the ducts 2b and 12, is provided a damper 14 which when opened allows the duct 2b to communicate with the duct 12 and when closed position the communication between the ducts 2b and 12 is broken.

Figure 3:
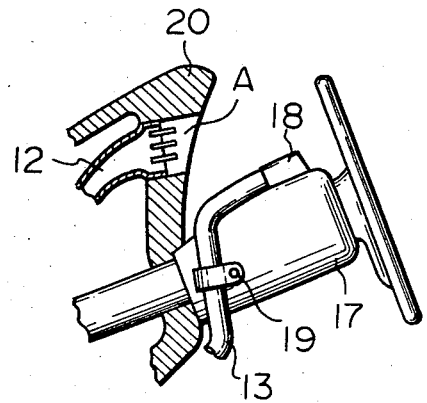
FIG. 3 is a partially sectioned schematic view of a part of the apparatus shown in FIG. 2.

According to the present invention, a rapid heating or cooling duct 13 is bifurcated from the downstream duct 2b at the junction between the ducts 2b and 12. The bifurcated duct 13 has a damper 14a at the junction of the ducts 2b and 13 which when opened allows the duct 2b to communicate with the duct 13 and when closed the communication between the ducts 2b and 13 is broken. The duct 13 extends upto the vicinity of a steering column cover 17 of the automobile, and is connected to a heater assembly or unit 18 secured to, for example, an upper end of the cover 17, by means of a cramp 19 or the like, as shown in FIG. 3.

Figure 4:
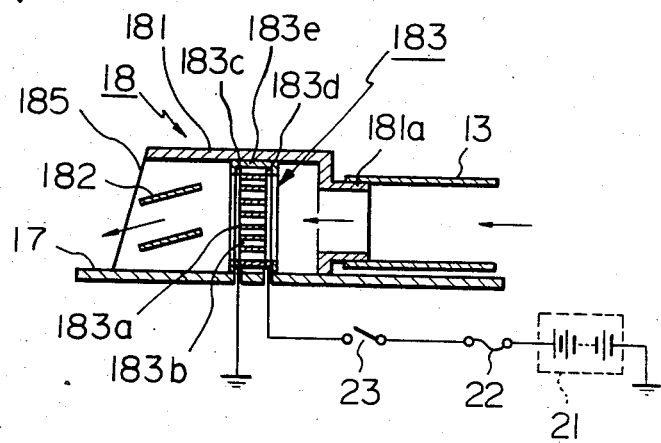
FIG. 4 is an enlarged and detailed sectional view of the heater assembly shown in FIG. 2.
Figure 5:
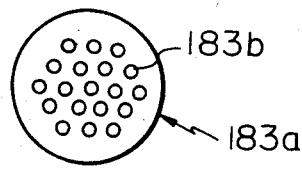
FIG. 5 is an elevational view of the heating element shown in FIG. 2.

The detailed construction of the heater assembly 18 is shown in FIG. 4. The assembly 18 has a hollow plastic case or cover 181 which is secured to the outer surface of the steering column cover 17, by means of set screws (not shown). In the hollow case 181, are provided a heater 183 and an adjustable deflector or louver 182.

The case 181 is connected at its end 181a, to the duct 13 which is made of plastic or the like. The deflector 182 includes deflecting plates which can be manually actuated by the driver, so that the inclination of the plates can be changed. The louver 182 may be of course, a fixed type, i.e. non-adjustable louver. The heater 183 includes, for example, a honey-comb like heating element 183a which has a plurality of through holes 183b, and which has, on its opposite faces, electrode layers 183c and 183d which are, for example, coated on the heating element 183a. The heating element 183a is held in an insulation holder 183e which is secured to the steering column cover 17 and the case 181 by means of set screws (not shown) or the like.

The heating element 183a has a positive temperature coefficient (PTC) in which the electrical resistance rapidly increases at a predetermined temperature. The heating element 183a can be made of, for example, barium titanate PTC ceramic. The heating element 183a has, preferably, a circular or rectangular shape in cross section, but may be of any shape. The shape of the through holes 183b is also not limited to a circle, but may be rectangular or any other shape. One of the electrode layers 183c and 183d is connected to an electric power supply, such as a battery 21, through a fuse 22 and a switch 23, and the other electrode layer is grounded.

It should be noted that, although FIG. 1 shows a prior art, the assembly 18 of the present invention is illustrated therein to show the location of the assembly 18 in an automobile.

The air is blown out from end opening 185 of the heater assembly 18. As can be seen from FIG. 6, the air blown from the end opening 185 (FIG. 4) directly strikes upon the face or hands of the driver.

Figure 6:
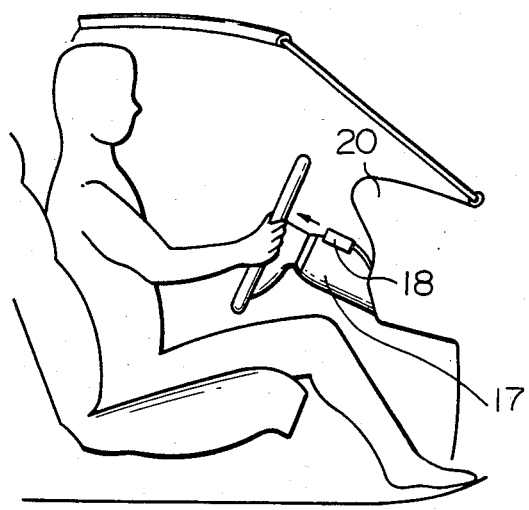
FIG. 6 is a schematic view showing a positional relationship between a driver and a heater assembly on a steering column cover.
Figure 7:
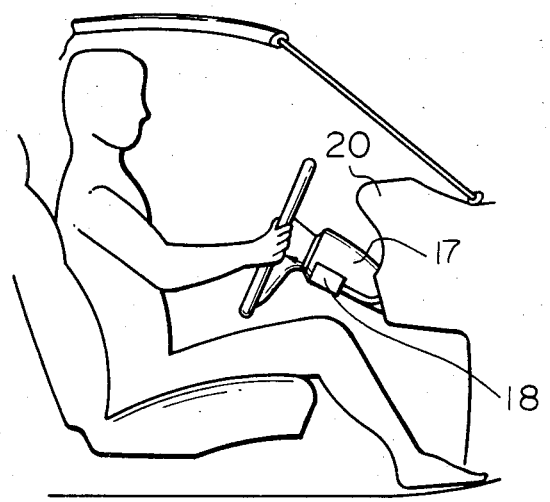
FIG. 7 is a schematic view showing a different positional relationship between a driver and a heater assembly.

The heater assembly 18 may be secured to the lower surface of the column cover 17, as shown in FIG. 7, rather than in the location shown in FIG. 6.

The apparatus of the present invention operates as follows.

After an automobile has been parked for a long time under the scorching heat of the sun in summer, the driver operates a switch (not shown) for actuating the damper 14a (FIG. 2) to bring the damper 14a into an open position, designated by a solid line, in which the duct 13 communicates with the duct 2b and, in addition, the driver operates a starter switch (not shown) of the air conditioning/heating apparatus for driving the air fan 4 and a cooler switch (not shown) for driving the cooling heat exchanger 5, so that the fan 4 rotates and the cooling heat exchanger operates. The air introduced into the main duct 2 by the fan 4 is cooled by the cooling heat exchanger 5. The dampers 9, 11 and 14 may be in their closed positions or in their open positions. The damper 3 may be in one of its two alternative positions. The damper 7 is in its first position, designated by a solid line, in which the air does not flow through the heating heat exchanger 6. The movement of the damper 7 between the first position and a second position, designated by a dotted line, in which the air flows through the exchanger 6, can be manually effected by the driver through an actuation lever (not shown). The cool air which is cooled by the exchanger 5 comes into the duct 13 and then passes through the through holes 183b (FIG. 4) of the heating element 183a, which is not activated, and is blown from the opening 185, toward the driver.

Alternatively, for example at an early time in the morning in winter, the driver turns the switch 23 ON to activate the heating element 183a. The fan 4 is actuated, but the cooling heat exchanger 5 is not actuated. The damper 3 is in either one of the two alternative positions. Until the engine coolant i.e. the water becomes sufficiently hot, the damper 7 can occupy either its open position or its closed position. The dampers 9, 11 and 14 are put in their respective open or closed positions, designated by solid lines in FIG. 2, in response to the operation of the switch 23. The damper 14a is brought into its open position, designated by a solid line in FIG. 2. Therefore, the air from the fan 4 comes into the duct 13 and is, then, heated when its passes through the heating element 183a, and is blown from the opening 185 toward the driver.

When the temperature of the engine coolant rises enough, the switch 23 is automatically or manually opened, so that electric power is no longer fed to the heating element 183a. The damper 7 is brought into its second position, designated by a dotted line in FIG. 2. The hot engine coolant flows in the heat exchanger 6 and heats the air passing through the heat exchanger 6. The dampers 9, 11, 14 and 14a are properly brought into one of their two alternative positions, respectively.

Figure 8:
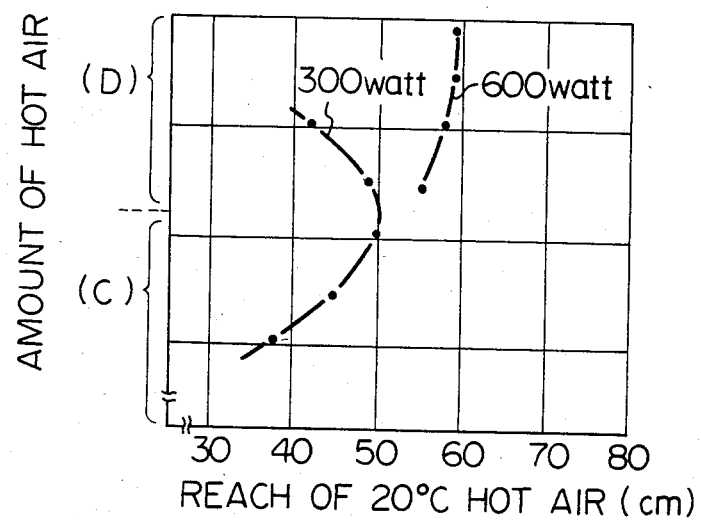
FIG. 8 is a diagram showing experimental results of the relationships between the amount and the reach, of hot air, at two different heat values of the heating elements.

FIG. 8 shows experimental results of the reach of hot air of 20° C. blown from the opening 185 of the assembly 18 when the atmospheric temperature is 0° C., in which two heating elements were used, one having a 300 watt calorific value and the other having a 600 watt calorific value. The engine coolant was not hot enough to heat the air and, accordingly, the air was heated only by the heating element 183a. The heating element of 600 watts had a surface area twice that of the heating element of 300 watts.

In the case of the 300 watt heating element, the reach of the 20° C. hot air increases as the amount of the hot air increases in the range (C) of a small amount of the hot air, because the amount of the hot air which rises or blows up due to the difference in temperature between the hot air (20° C.) and the atmosphere (0° C.) decreases as the total amount of the hot air blown out increases. However, when the amount of hot air is large, as designated at (D), the reach decreases as the amount increases, since the blowing speed of the hot air is high at the high amount area (D) and since a large amount of surrounding cold air is drawn in the hot air. According to the experimental results, the maximum reach in the case of the 300 watt heater was about 50 cm which is sufficient for the hot air from the assembly 18 to directly strike upon the face of the driver. That is, the distance between the assembly 18, which is located on the steering column cover 17, and the face of the driver is usually less than 50 cm.

In the case of the 600 watt heater, the maximum reach was about 60 cm. When the blowing openings of the hot air are located on the instrument panel 20, shown at A in FIG. 1 in the prior art, the distance between the blowing openings A and the driver's face is usually approximately 60 cm. Therefore, it is necessary to use the 600 watt heater, in order to directly blow the hot air towards the driver's face. However, since the 600 watt heater consumes too much electric power of a battery of the automobile, such a high electrical load heater is not recommended.

The heating element 183a is not limited to a PTC element having a resistance which suddenly increases at a specified temperature, but may be made of a ceramic material, such as SiC, or a sintered metal.

The cooling heat exchanger 5 can be dispensed with. The outer case 181 of the assembly 18 can be located on the steering column cover.

According to the invention, as mentioned above, hot or cool air blowing openings are provided near, on or in the steering column cover which is in front of the driver, and the heating element is located adjacent to the blowing openings. Therefore, the invention is advantageous, particularly when a quick cooling or heating effect is desired or when it is desired to direct cool or warm air to a specific area, such as the driver's face or hands.

Furthermore, a 600 watt heater which was necessary to directly blow hot or cold air towards the driver's face in the prior art, can be replaced by a 300 watt heater in the present invention, and this 300 watt heater has the same cooling or heating effect, with less power consumption, as that of the 600 watt heater of the prior art.

Figure 9:
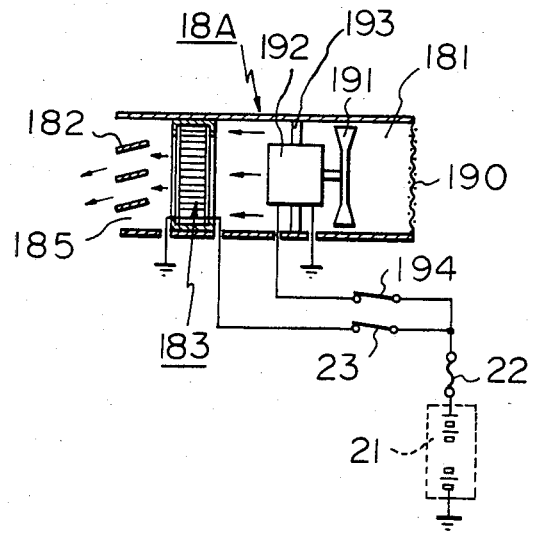
FIG. 9 is a sectional view of another embodiment of a heater assembly.

FIG. 9 shows another embodiment of the present invention, in which a different fan 191 is arranged in the heater assembly 18A, upstream of the heater 183. The fan 191 is connected to and driven by a motor 192 held by means of a retainer 193 secured to the case or cover 181. The motor 192 is electrically connected to the battery 21 through a switch 194, which is, for example, provided on the instrument panel 20. Preferably, an air filter 190, such as a wire-netting, is provided upstream from the fan 191. In this arrangement shown in FIG. 9, the heater assembly 18A includes the motor driven fan 191 which can be actuated independently from the fan 4 (FIG. 2). The fan 191 and the heater 183 can be, therefore, actuated, for example, only when quick heating is desired.

Figure 10:
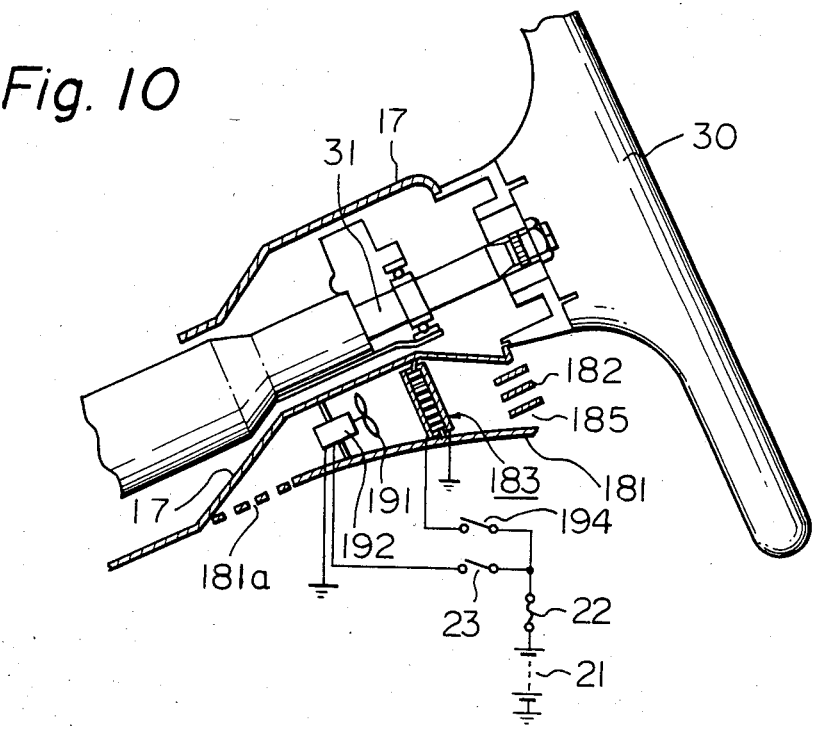
FIG. 10 is a sectional view of a steering column cover on which is mounted the heater assembly shown in FIG. 9.
Figure 11:
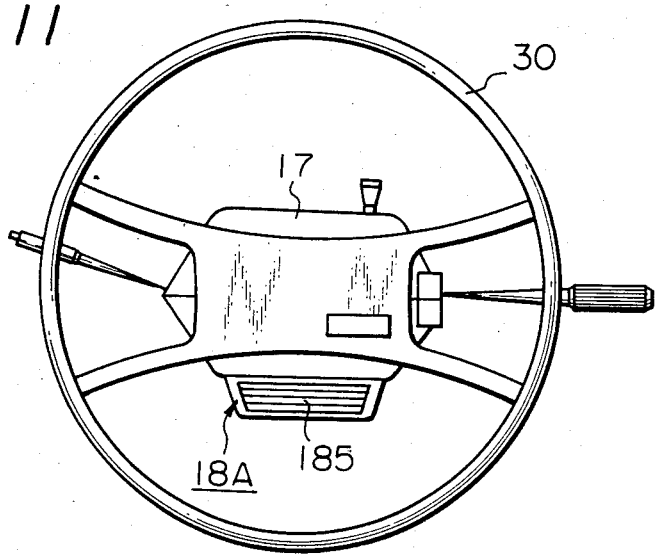
FIG. 11 is an elevational view of FIG. 10.

FIGS. 10 and 11 show an arrangement of the heater assembly 18A, shown in FIG. 9, on the lower portion of the steering column cover 17. The heat-resisting plastic case 181 of the heater assembly 18A is secured to the steering column cover 17 at its underside. The case 181 has air inlet openings 181a. The outlet openings 185 with the louver 182 open toward the driver, from the lower half of the circle of a steering wheel 30. The numeral 31 (FIG. 10) designates the steering shaft connected to the steering wheel 30.

Figure 12:
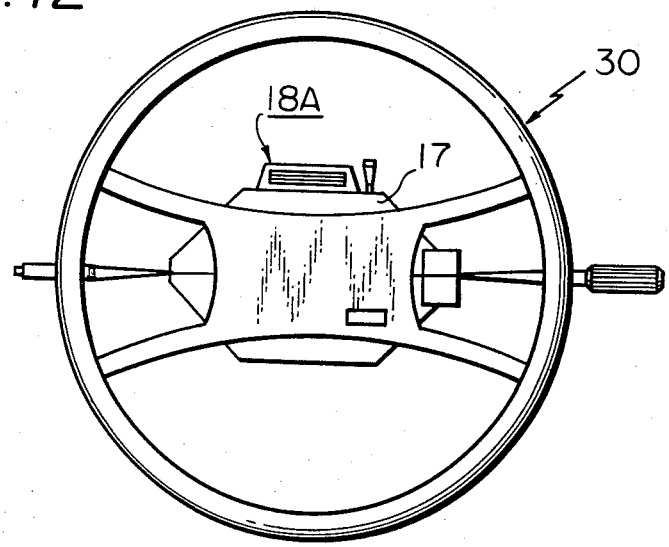
FIG. 12 is an elevational view of a steering wheel with a steering column cover, in which the heater assembly shown in FIG. 9 is located on the upper side of the steering column cover, which is a different location than that shown in FIG. 11.
Figure 13:
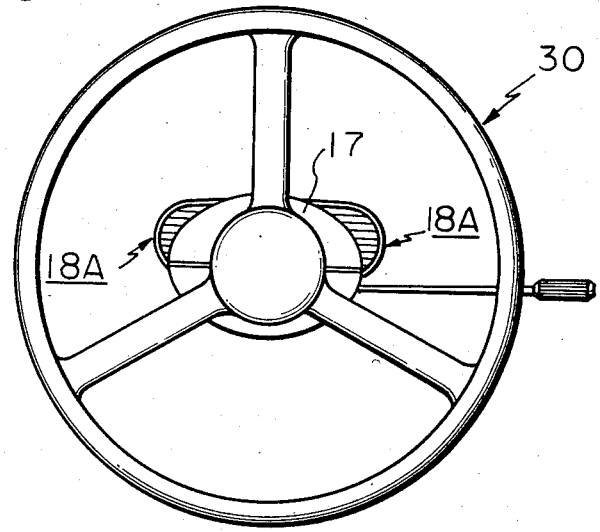
FIG. 13 is a view similar to FIG. 11, but showing two separate heater assemblies located on opposite sides of the steering column cover.

FIGS. 12 and 13 show two different locations of the heater assembly 18A on the steering column cover 17. In FIG. 12, the heater assembly 18A is located on the upper side of the steering column cover 17, similarly to FIGS. 3 and 6. In FIG. 13, two heater assemblies 18A are located on the right and left sides of the steering column cover 17. Alternatively, it is also possible to provide a single heater assembly 18 which has two outlet openings, located as shown in FIG. 13. The arrangement illustrated in FIG. 13 can be advantageously used to warm the driver's hands.

Figure 14:
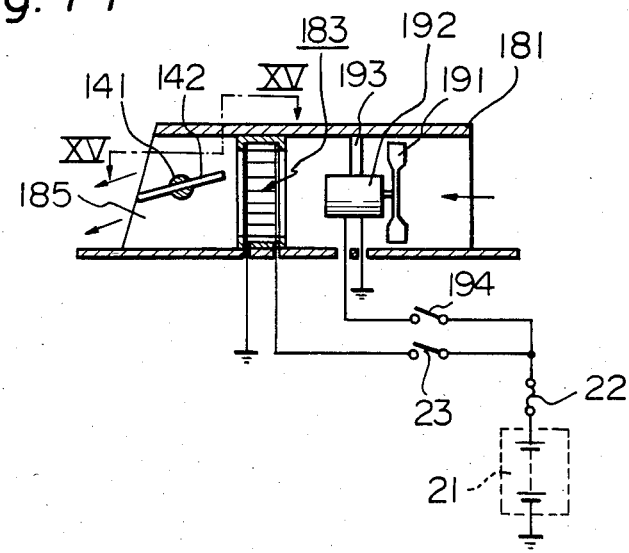
FIG. 14 is a sectional view of a heater assembly according to still another embodiment of the invention.
Figure 15:
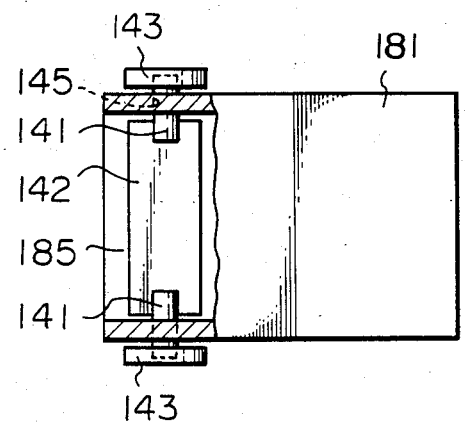
FIG. 15 is a sectional view taken along the line XV—XV in FIG. 14.
Figure 16:
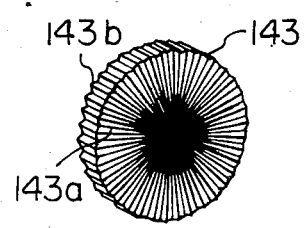
FIG. 16 is a perspective view of the knob shown in FIGS. 14 and 15.

FIGS. 14–16 show another embodiment of the invention, in which a deflector plate 142 is provided in place of the louver 182 in FIG. 4 or 9. The plate 142 is connected to rotating shafts 141 which are rotatably inserted in holes 145 formed in the case or cover 181 of the heating assembly. To the outer ends of the shafts 141 projecting from the case 181 are secured knobs 143 which are provided with peripheral knurls 143b, as shown in FIG. 16. The plate 142 and the shafts 141 can be made of metal. The knobs 143 can be made of plastic material, such as Teflon (TRADE MARK), which has a high resistance against heat and a low thermal conductivity. The knobs 143 are preferably provided, on their opposite side faces, with radially extending heat escaping fins 143a, as shown in FIG. 16. The knurls 143b and fins 143a can be dispensed with. The deflector plate 142 can be replaced by a plurality of parallel plates, like the louver 185 shown in FIG. 4 or 9.

The plate 142 can be manually actuated by one of the knobs 143. In FIG. 4 or 9, when the louver 185 is manually actuated to control the direction of the air flow, the driver directly grasps the louver with his hand, so that the driver's hand is exposed to hot air. Therefore, when the temperature of the hot air is considerably high, it is very difficult for the driver to manually actuate the louver. This difficulty can be solved by the provision of the knobs 143 in FIGS. 14–16 which are not located in the air flow, but are located outside the case 181 of the heater assembly 18A. The driver can easily operate the deflector plate 142 with the knobs 143 without putting his hand in the flow of hot air. In place of the two knobs 143, a single knob 143 can be provided on one of the shafts 141.

Figure 17:
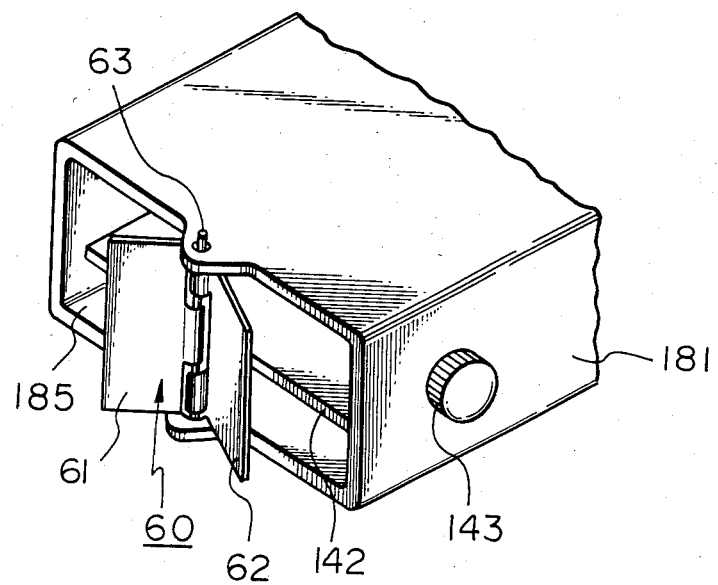
FIG. 17 is a perspective view of a heater assembly according to another embodiment of the invention.
Figure 18:
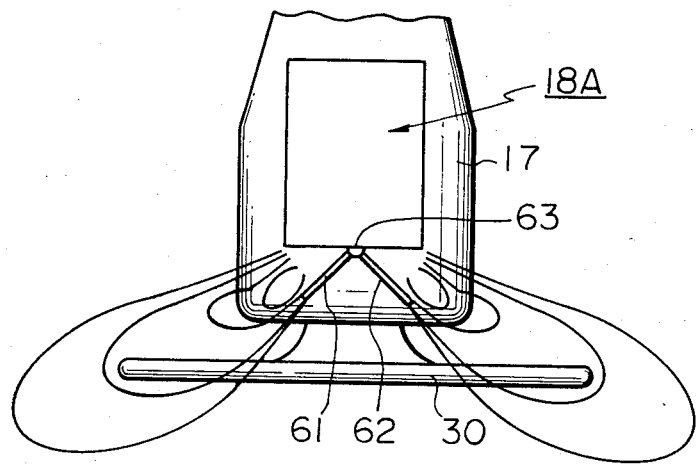
FIGS. 18 and 19 are plan views of FIG. 17 showing temperature distribution of the hot air when the hinged deflector plates occupy two different positions.

In an embodiment illustrated in FIGS. 17 and 18, in addition to the deflector plate 142, another deflector 60 is provided at the outlet opening 185. The deflector 60 has two plates 61 and 62 which are hinged to a pin 63 extending perpendicular to the shafts 141 of the knob 143. The pin 63 is supported by the case or cover 181 of the heating assembly. The hinged plates 61 and 62 can be placed in an open position, shown in FIG. 18, and a closed position, shown in FIG. 19. The hinged plates 61 and 62 can be directly and manually actuated to selectively occupy the closed or open position.

Figure 19:
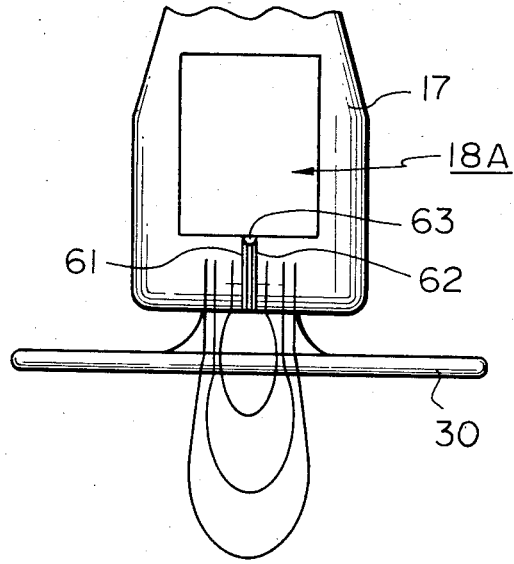
Figure 20:
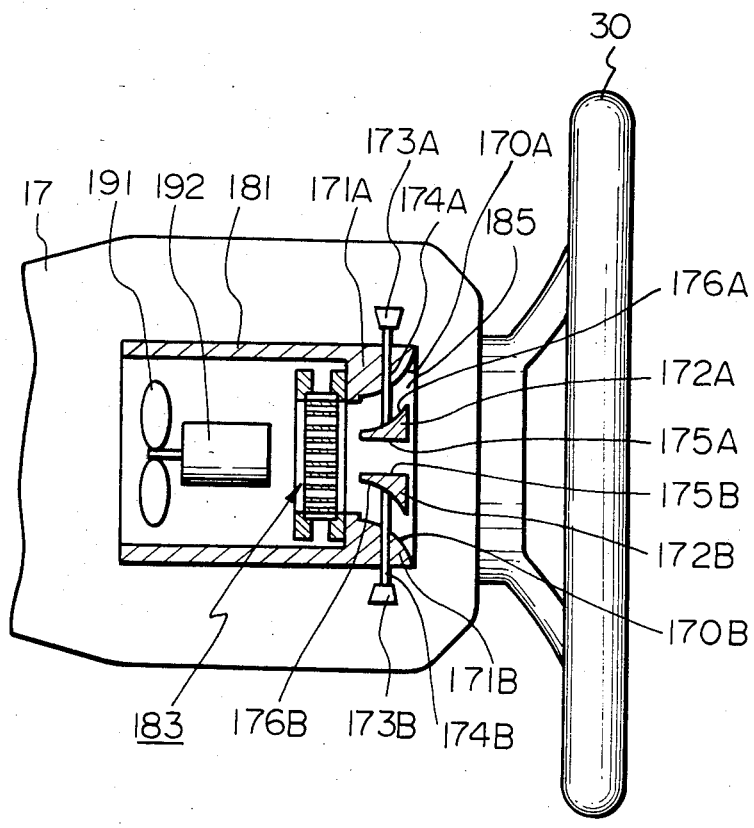
FIG. 20 is a sectional view of a heater assembly according to another embodiment.
Figure 21:
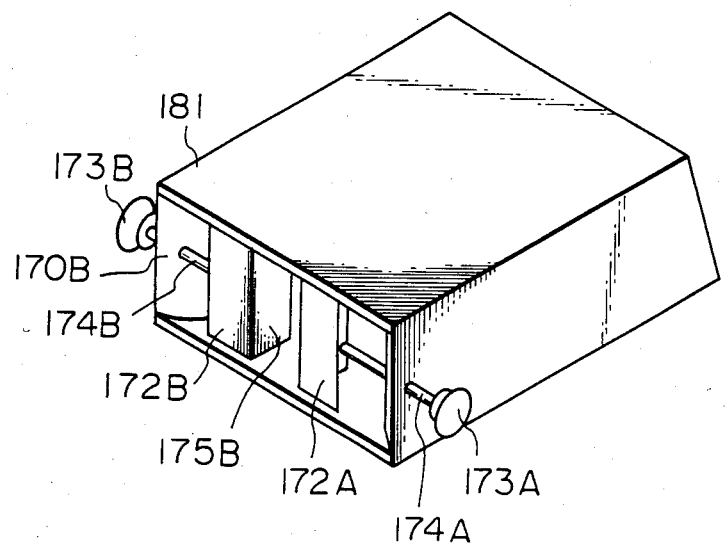
FIG. 21 is a perspective view of the heater assembly shown in FIG. 20.

When the deflector 60 is in its open and closed positions, the temperature distributions of the hot air blown from the outlet opening 185 are illustrated in FIGS. 18 and 19, respectively. Therefore, particularly when it is desired to quickly blow hot air to the driver's face or neck, the deflector 60 is brought into the closed position shown in FIG. 19, and when it is desired to warm the driver's hands grasping the steering wheel 30, the deflector 60 is brought into the open position, shown in FIG. 18.

Figure 22:
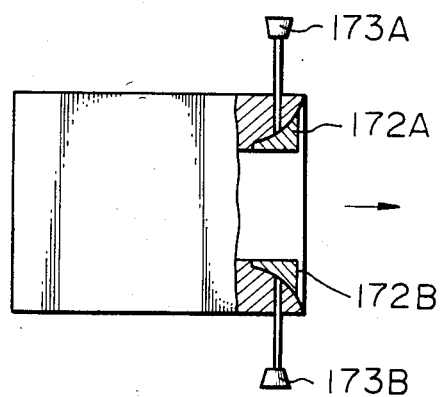
FIGS. 22-25 are partial views of FIG. 20 showing different positions of the two deflector plates.
Figure 23:
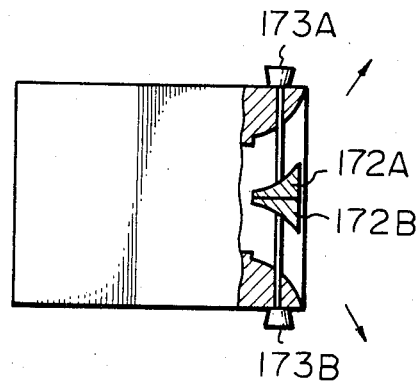

In an embodiment illustrated in FIGS. 20-25, the deflector is composed of two plates 172A and 172B which are independently movable. The plates 172A and 172B are connected to rods 174A and 174B which axially move in bosses 171A and 171B formed at the outlet end of the case or cover 181. The rods 174A and 174B have, at their outer end knobs 173A and 173B, respectively. The bosses 171A and 171B have inclined inner surfaces 170A and 170B, and the plates 172A and 172B have inclined surfaces 176A and 176B complementary to the inclined surfaces 170A and 170B, respectively. The plates 172A and 172B have flat surfaces 175A and 175B which come into close contact with each other, as shown in FIG. 23.

When it is necessary to warm the driver's face or neck, the plates 172A and 172B are both brought into their retracted positions, shown in FIG. 22, in which the inner surfaces 176A and 176B of the plates 172A and 172B come into close contact with the corresponding inner surfaces 170A and 170B of the bosses 171A and 171B, respectively.

When it is necessary to warm the driver's hands, the plates 172A and 172B are both brought into their forward positions, as shown in FIG. 23, in which the flat surfaces 175A and 175B of the plates come into close contact with each other.

Figure 24:
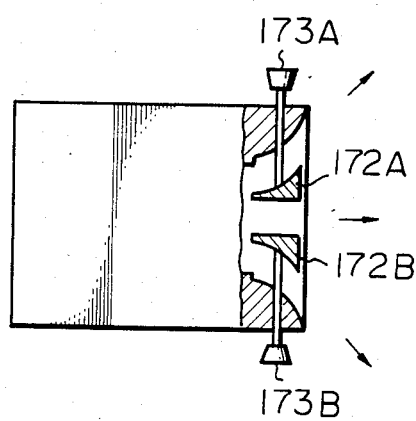

When it is necessary to warm both the driver's hands and face, the plates 172A and 172B are brought into their partly retracted positions, as shown in FIG. 24, in which the plates 172A and 172B are separate from each other and from the corresponding inner surfaces 170A and 170B of the bosses 171A and 171B.

Figure 25:
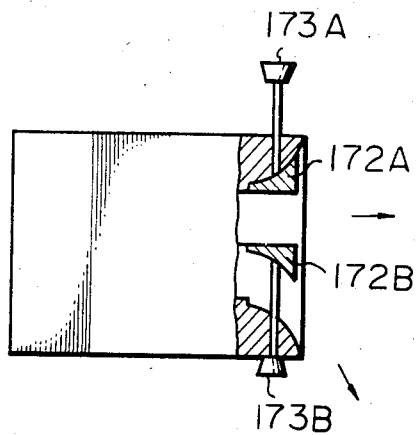

In an arrangement shown in FIG. 25, the plate 172A is in its retracted position and the plate 172B is in its forward position, so that the flow of hot air, designated by arrows, warms the driver's face and one of his hands.

I claim:

1. An air conditioning/heating apparatus for an automobile having a steering column, a steering wheel thereon, and a fixed cover for the column, comprising a main duct, a motor driven air fan in the main duct, a heating heat exchanger arranged in the main duct, and a bifurcated air duct communicating with said main duct downstream of said fan, a damper located at the junction of the bifurcated duct with the main duct for selectively establishing or breaking communication between the two ducts, said bifurcated duct extending to the steering column cover and having an air outlet opening for directing at least some the air therefrom between the rim and hub of the wheel onto the driver, and an electrical heating element arranged in the bifurcated air duct for heating the air passing therethrough.

2. In an automobile provided with a conventional windshield and dashboard and conventional heating apparatus comprising a main air duct provided with outlet openings in the dashboard, outlet openings for directing air upward upon the windshield and at least one outlet opening for directing air downward below the dashboard, a heating heat exchanger in the main duct, a motor driven fan in the main duct, a steering column, a steering wheel thereon and a fixed cover for the column, the combination of a heater assembly comprising:

a casing attached to the cover and defining an air duct provided with an inlet at one end and an outlet at the other end for directing at least some of the air issuing from said outlet between the rim and hub of the wheel onto the driver; and an electrical heating element in said casing duct closely adjacent said casing outlet for heating air passing therethrough.

3. An air conditioning/heating apparatus for an automobile having a steering column, a steering wheel thereon, and a fixed cover for said column, comprising:

a main duct;

a motor driven air fan provided in said main duct;

a heating heat exchanger arranged in said main duct;

a bifurcated air duct branching off of said main duct at a junction downstream of said fan;

means operatively attached to said bifurcated duct to open and close said bifurcated duct;

said bifurcated duct extending from said junction apart from said main duct to said steering column cover and having an air outlet opening for directing at least some of the air therefrom between the rim and hub of the wheel onto the driver; and an electrical heating element arranged in said bifurcated air duct closely adjacent said outlet opening for heating the air passing therethrough.

4. In a heater assembly for an automobile provided with a conventional windshield and dashboard, a steering column, a steering wheel thereon, a fixed cover for the column, and a conventional heating apparatus comprising a main air duct provided with outlet openings in the dashboard, outlet openings for directing air upward upon the windshield and at least one outlet opening for directing air downward below the dashboard, a heating heat exchanger in the main air duct, and a motor driven fan in the main air duct, said heater assembly comprising:
a casing attachable to said fixed cover and defining an air duct, said casing having an air inlet at one end at which said air inlet opens to the atmosphere around said fixed cover and an air outlet at the other end for directing at least some of the air issuing from said air outlet between the rim and hub of the wheel onto the driver;
another motor driven fan provided in said duct defined by said casing; and
an electrical heating element arranged in said duct defined by said casing closely adjacent said air outlet for heating air passing therethrough.

5. A heater assembly for an automobile provided with a conventional windshield and dashboard and conventional heating apparatus comprising a main air duct provided with outlet openings in the dashboard, outlet openings for directing air upward upon the windshield and at least one outlet opening for directing air downward below the dashboard, a heating heat exchanger in the main duct, a motor driven fan in the main duct, a steering column, a steering wheel thereon, and a fixed cover for the column, comprising:
a casing attachable to the cover and defining an air duct provided with an inlet at one end and an outlet at the other end for directing at least some of the air issuing from said outlet between the rim and hub of the wheel onto the driver; and
an electrical heating element in said casing duct closely adjacent said casing outlet for heating air passing therethrough.

6. The heating assembly defined in claim 5 including a motor driven fan in the casing duct upstream of the heating element for drawing air into the inlet and blowing it out of the outlet.

7. Structure according to claim 2, comprising two heater assemblies which are attached to the sides of the steering column cover.

8. An assembly according to claim 5 or 2, wherein said heating element comprises a perforated plate having a positive temperature coefficiency.

9. An apparatus according to claim 5 or 2, wherein said heater assembly comprises a deflector means in the casing air outlet opening for adjusting the direction of the air being blown out from the air outlet opening.

10. An apparatus according to claim 9, wherein said deflector means comprises manually adjustable louver plates.

11. An apparatus according to claim 9, wherein said deflector means comprises a rotatable deflector plate which is connected to a rotatable knob located outside the air duct of the heater assembly.

12. An apparatus according to claim 11, wherein said knob comprises a heat radiating means.

13. An apparatus according to claim 12, wherein said heat radiating means comprises fins provided on the side faces of the knob.

14. An apparatus according to claim 9, wherein said deflector means comprises two rotatable hinged plates which are located at the center of the air outlet opening.

15. An apparatus according to claim 9, wherein said deflector means comprises a deflector plate, which is rotatable about an axis crossing the air outlet opening, and two hinged plates, which are rotatable about an axis perpendicular to the first mentioned axis and which are located at the center of the air outlet opening downstream of the first mentioned deflector plate, in the direction of the air flow.

16. An apparatus according to claim 9, wherein said deflector means comprises two separate deflector plates which are capable of independently moving toward and away from each other.

17. A heater assembly defined in claim 4, further comprising:
a deflector provided at said air outlet for directing the air from said air outlet in a desired direction.

18. An assembly according to claim 2, wherein said casing is attached to an upper surface of the steering column cover.

19. An assembly according to claim 2, wherein said casing is attached to a lower surface of the steering column cover.

20. The assembly defined in claim 5 wherein the inlet of the air duct defined by the casing is connected to the main duct downstream of the fan therein.

21. The combination defined in claim 2 including a motor driven fan in the casing duct upstream of the heating element for drawing air into the inlet and blowing it out of the outlet.

22. The combination defined in claim 2 wherein the inlet of the air duct defined by the casing is connected to the main duct downstream of the fan therein.

23. The assembly defined in claim 20 wherein the apparatus is for heating or air conditioning and there is a cooling heat exchanger in the main duct.

24. The assembly defined in claim 22 wherein the apparatus is for heating or air conditioning and there is a cooling heat exchanger in the main duct.

25. The assembly defined in claim 5 or 2 wherein the heating element is of the order of 300 watts.

26. The apparatus defined in claim 1 in which the heating element is upstream of and closely adjacent the air outlet opening.

27. The apparatus defined in claim 1 including a cooling heat exchanger in the main duct.

28. The apparatus defined in claim 27 in which the bifurcated air duct communicates with the main duct downstream of the cooling and the heating heat exchangers.

29. An air conditioning/heating apparatus defined in claim 3, wherein
said means comprises a damper located at said junction of said bifurcated air duct.

30. An air conditioning/heating apparatus defined in claim 3, wherein
said junction is formed at a portion of said main duct which is downstream of said fan and said heating heat exchanger.

31. An air conditioning/heating apparatus defined in claim 3, further comprising a cooling heat exchanger arranged in said main duct upstream of said heating heat exchanger.

32. An air conditioning/heating apparatus defined in claim 31, wherein said junction is formed at a portion of said main duct downstream of said fan and said heating heat exchanger.

33. An air conditioning/heating apparatus defined in claim 3, further comprising:
a deflector provided at said air outlet opening for directing the air from said outlet opening in a desired direction.

* * * * *